United States Patent [19]
Decoene et al.

[11] 3,946,746
[45] Mar. 30, 1976

[54] HARVESTING MACHINES

[75] Inventors: Frans J. G. C. Decoene, Zedelgem; Cornelis G. M. Muijs, Sint-Kruis Brugge, both of Belgium

[73] Assignee: Clayson N.V., Zedelgem, Belgium

[22] Filed: June 25, 1974

[21] Appl. No.: 482,929

[30] Foreign Application Priority Data
June 27, 1973 United Kingdom............... 30634/73

[52] U.S. Cl.............. 130/27 P; 130/27 Q; 56/14.6
[51] Int. Cl.² ..................... A01F 12/20; A01F 12/44
[58] Field of Search ............... 130/27 R, 27 P, 27 Q; 56/14.6

[56] References Cited
UNITED STATES PATENTS

| | | | |
|---|---|---|---|
| 756,728 | 4/1904 | Stewart | 130/27 |
| 1,761,346 | 6/1930 | Jelbart | 130/27 R |
| 2,927,694 | 3/1960 | Scranton et al. | 130/27 Q X |
| 3,662,763 | 5/1972 | Denison et al. | 130/27 P |

FOREIGN PATENTS OR APPLICATIONS
172,246   8/1952   Germany

*Primary Examiner*—Hugh R. Chamblee
*Attorney, Agent, or Firm*—Frank A. Seemar; John R. Flanagan; Joseph A. Brown

[57] ABSTRACT

The harvesting mechanism of the present invention uses a transversely extending threshing means and a rotary separating mechanism. The separating mechanism includes a transversely extending separating rotor having crop treating and crop conveying elements cooperating with a separating concave operable to receive crop material from the threshing means and separate grain from the crop material while the material is being conveyed spirally to one end for discharge.

12 Claims, 13 Drawing Figures

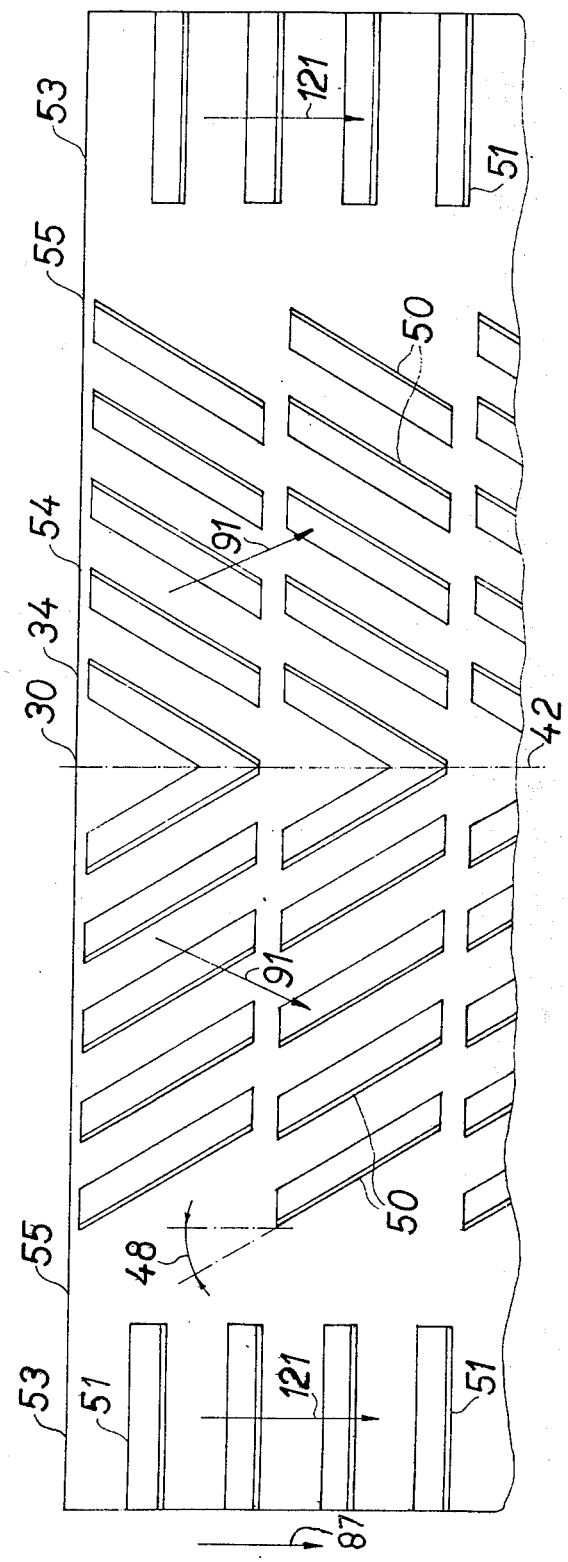

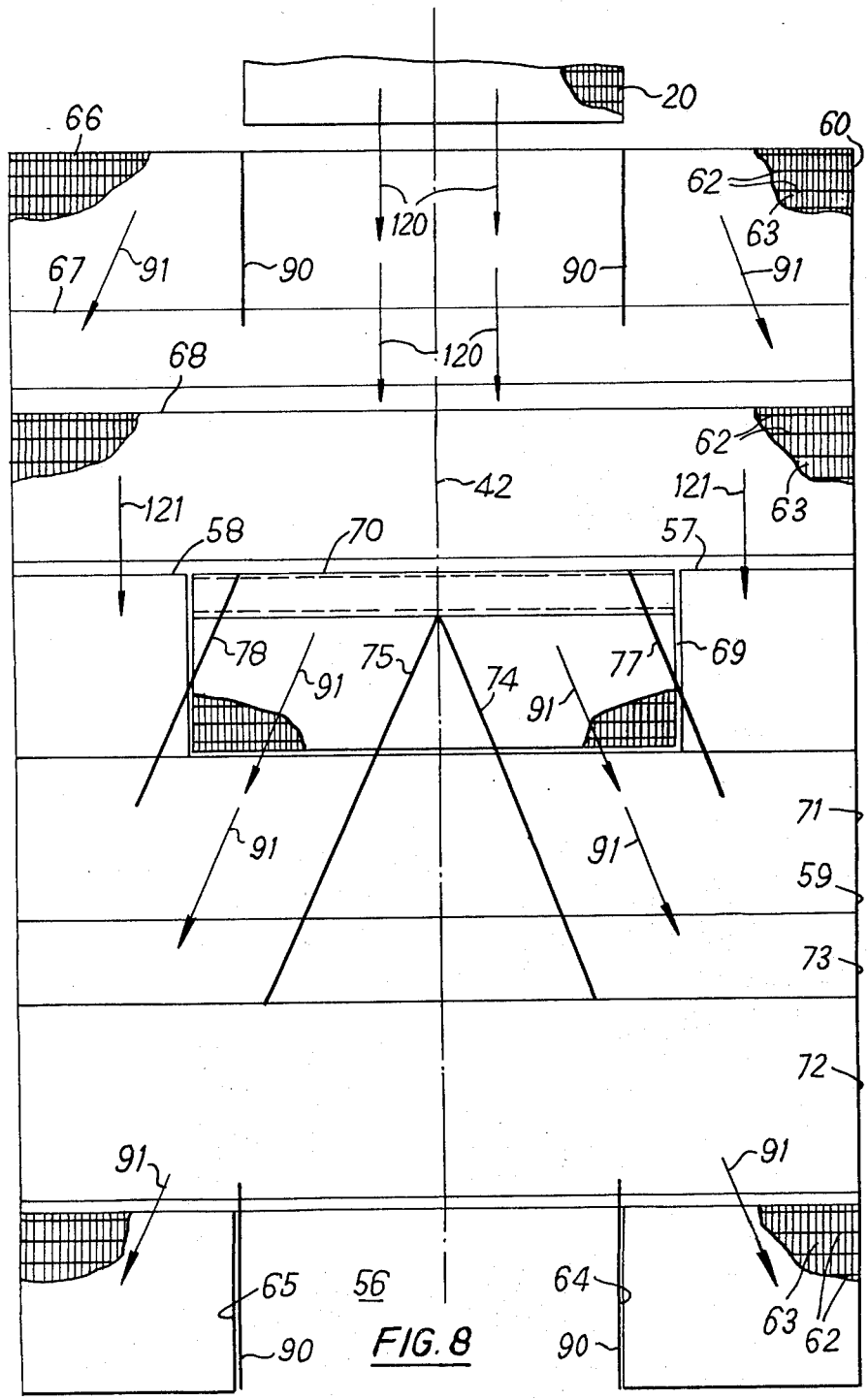

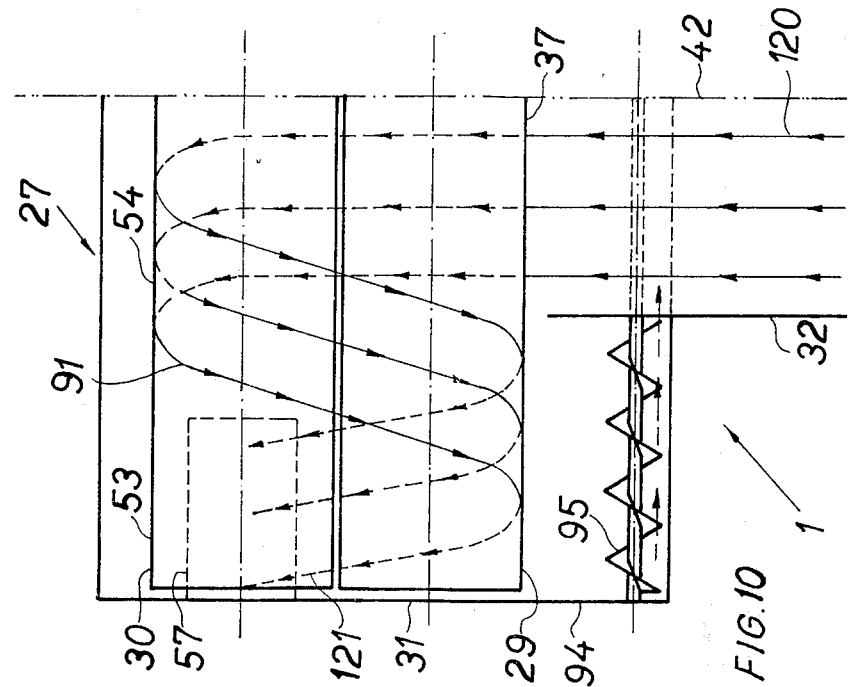
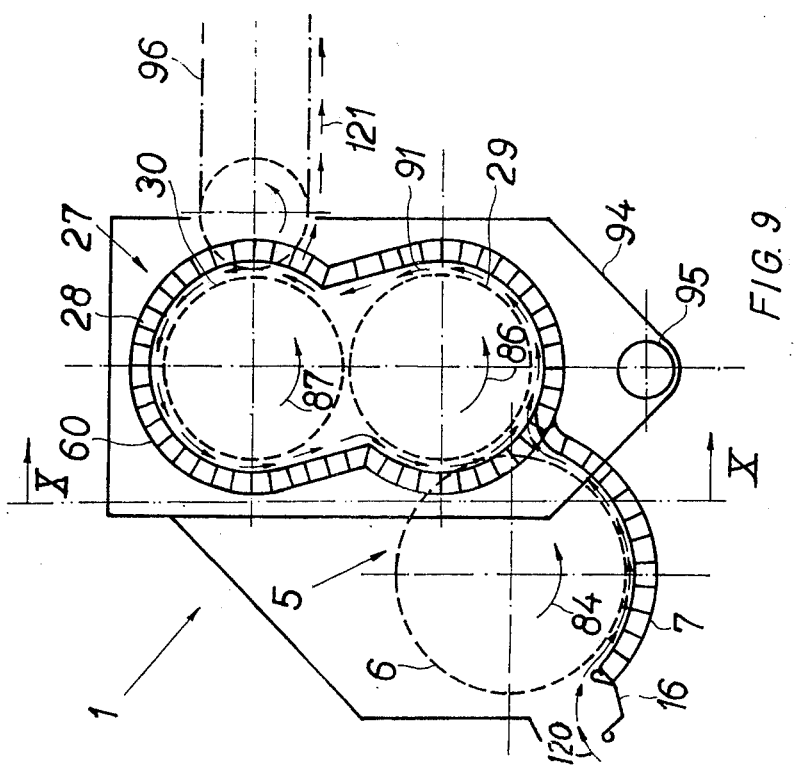

HARVESTING MACHINES

BACKGROUND OF THE INVENTION

The present invention relates to harvesting machines such as combine harvesters (also referred to hereinafter as combines) and, more particularly, to the threshing and separating mechanisms of harvesting machines.

DESCRIPTION OF THE PRIOR ART

In a combine harvester, the grain is threshed, separated, cleaned and stored for subsequent transport from the field and this is considered to be the most economical method of harvesting crop material. In the standard commercially available combines, the rotatable threshing cylinder and co-operable concave extend transversely to the direction of movement of the combine. The crop is fed to the concave and passed between the concave and threshing cylinder whereby it is threshed. The straw is discharged rearwardly of the concave onto reciprocating or oscillating straw walkers that extend longitudinally of the combine. Much of the grain contained in the crop material fed to the threshing mechanism is threshed and separated by that mechanism and some of the remainder is separated from the straw whilst the latter is on the straw walkers. Straw walkers have proved to be the capacity-limiting components of the standard combine because, when operating at high capacity rates, much grain is discharged with the straw to the straw walkers which are unable to cope with the required separation, and hence unacceptable grain losses occur.

While the terms "grain" and "straw" are used principally throughout this specification for convenience, it should be understood that the terms are not intended to be limiting. Thus "grain" refers to that part of the crop material which is threshed and separated from the discardable part of the crop material which is referred to as "straw".

Recent developments in combine harvesters have led to a so-called axial-flow-type combine harvester, wherein the threshing and separating mechanism extends longitudinally (fore-and-aft) of the machine, parallel to the direction of movement and comprises at least one threshing and separating rotor and co-operable concave. The crop material is fed to the forward end of the threshing mechanism and is formed into a mat which passes generally axially therethrough in a spiral path. In axial flow machines, the crop material is subjected to a threshing and separating action far longer than in a standard machine of comparable size and, therefore, the efficiency of the former is greater than the efficiency of the latter but this of itself has to date not proved to be an over-riding advantage. Some of the problems associated with axial flow machines are that the power requirement is greater than with a comparable standard machine due to the sustained threshing and separation and that it is not always possible to cope with every condition and type of crop material which may be encountered. It will be appreciated that a harvesting machine must be able to handle a range of crop materials and all conditions thereof without necessitating major adjustment or replacement of components if it is to be a practicable, and therefore commercial, proposition. Another difficulty with axial flow machines resides in the flow of crop material through the threshing and separating mechanism. It only requires a relatively small amount of crop material to cease moving through the mechanism for a major obstruction soon to accumulate, resulting in jamming or breakdown due to power overload.

In another approach, a conventional transversely-extending threshing cylinder and concave has been combined with an axial-flow-type separating mechanism arranged generally behind the threshing mechanism. In this arrangement, the crop material is fed to the forward end of the threshing mechanism and is formed into a mat which passes in generally fore-and-aft direction of the machine between the threshing cylinder and co-operable concave and further in a generally fore-and-aft extending, spiral-shaped, path through the separating mechanism. The pattern of movement of the crop is thus changed abruptly at the transition between the threshing mechanism and the separating mechanism. This characteristic often results in considerable crop-feeding problems which make the machine impractical.

In a further embodiment of the foregoing principle, the axial-flow-type separating mechanism comprises two side-by-side and fore-and-aft extending rotors arranged in a single co-operable casing and the crop material has to move in a spiral path extending around both rotors. Major feeding problems are also inherent in this arrangement.

In still another approach, the orientation of the axial-flow-type separating mechanism has been changed so that it extends generally parallel to the threshing mechanism and has the infeed section thereof generally behind the threshing mechanism, with the discharge end in a substantially offset relationship with the threshing mechanism. This asymmetric arrangement of components has several disadvantages such as a complicated structure, an uneven distribution of weight and an uneven loading of the cleaning mechanism. Also, in order to have an appropriate grain separation action, the mat of crop material should move several times around the rotor of the separating mechanism, whereby much horsepower is required and the risk of jamming is increased.

Finally, there is known an arrangement in which a conventional threshing mechanism is combined with a separating cylinder and concave of the same width as the threshing mechanism and extending parallel thereto, and arranged to receive the crop discharged from the threshing mechanism at a central section thereof. The separating mechanism is operable spirally to convey part of the crop around the separating cylinder to one end and the remainder to the opposite end of the separating cylinder. However, this arrangement has failed to be successful due to crop-feeding problems at the transition between the threshing mechanism and the separating mechanism.

The foregoing is only a brief discussion of the major disadvantages of previously proposed harvesting machines and other disadvantages will be known to those skilled in the art. The main object of the present invention is to overcome or reduce one or more of these disadvantages.

SUMMARY OF THE INVENTION

According to the present invention there is provided a harvesting machine comprising a transversely-extending threshing mechanism having a thresher cylinder co-operable with a thresher concave, and a rotary separating mechanism of a width greater than that of the threshing mechanism and disposed parallel thereto with its ends extending past the respective ends of the threshing mechanism and being arranged spirally to convey the crop material received from the threshing mechanism towards each of its ends while submitting the crop to a separating action.

The separating mechanism may comprise a transversely-extending separating rotor having crop-treating and crop-conveying elements co-operable with a separating concave and operable in use to separate grain from the straw while conveying approximately half the mat of the straw in a spiral path to one end for discharge and the remainder of the straw in an opposite spiral path to the opposite end for discharge. Preferably the separating mechanism comprises at least two transversely-extending rotors arranged in side-by-side relationship in a single separator casing part defined by separator concaves. The rotors may be driven in the same direction and the crop is conveyed thereby in spiral paths which extend around both rotors at the inner side of said casing. Preferably, the spiral paths do not comprise more than one and a half loops or turns.

One rotor may comprise a plurality of rearwardly-inclined (with respect to the direction of rotation) separator tines or the like located at the end and at a central area. At the central area the tines are preferably arranged to extend over a width which corresponds to the width of an infeed opening of the separator mechanism. Between the ends and the central area, two areas of the rotor are provided with separator vanes which are inclined with respect to the longitudinal axis of the machine and are operable to convey the crop spirally outwardly towards the respective ends of the rotor. The second rotor may comprise similar separator vanes over the major portion of its surface while at the ends discharge elements may be provided. It should be noted that the two halves of each rotor are mirror images of each other.

In operation, the separator tines and vanes beat and rub the crop to separate the grain therefrom. The pattern of movement of the crop between the rotors and the casing is in a rearward direction underneath the central area of the first rotor, then spirally around both rotors, and in outward direction at the areas provided with separator vanes. At the outer ends of the rotors the straw mats are conveyed underneath the rotors in a generally rearward direction towards the discharge end where the straw mats are discharged.

The present invention provides an optimum combination of threshing and separating components enabling operation at high capacity levels with comparatively low grain loss percentages, whereby the overall power requirements of the machine are reduced. Also a regular and fluent flow of crop material through the threshing and separating mechanism is obtained, reducing the likelihood of jamming. Furthermore, fewer small pieces of straw are produced so that the load on the cleaning mechanism is reduced accordingly. With this reduction or elimination of certain disadvantages of known harvesting machines, a greater efficiency is realised, whereby a smaller, and therefore more lightweight, machine can be produced for a given capacity compared to a conventional machine of the same capacity. The smooth flow of crop material also means that a relatively thin straw mat is operated on by the threshing and separating mechanisms which results in a more efficient grain separation and hence a reduced grain loss without any major sacrifice in the power requirements of the machine.

The threshing and separating components are of relatively simple construction so reducing manufacturing and servicing costs.

IN THE DRAWINGS

A combine harvester embodying the invention will now be described in greater detail, by way of example, with reference to the accompanying drawings, in which:

FIG. 1 is a diagrammatic side view of the threshing and separating mechanism of the combine, FIG. 2 is a diagrammatic top view of FIG. 1, FIG. 3 is an enlarged sectional view with more details taken along the line III—III of FIG. 2, FIG. 4 is a view similar to that of FIG. 3 but taken along the line IV—IV of FIG. 2, FIG. 5 is a view similar to that of FIG. 3 but taken along the line V—V of FIG. 2, FIG. 6 is a partial development of the component indicated by VI in FIG. 2, FIG. 7 is a partial development of the component indicated by VII in FIG. 2, FIG. 8 is a schematic development of the component indicated by VIII in FIG. 1, FIG. 9 is a view similar to that of FIG. 1 but of another embodiment of the invention, FIG. 10 is a diagrammatic view taken along the line X—X of FIG. 9, FIG. 11 is a view similar to that of FIG. 1 but of still another embodiment of the invention, FIG. 12 is a diagrammatic top view of FIG. 11, and FIG. 13 is a side view of the combine.

DESCRIPTION OF THE PREFERRED EMBODIMENT

Figure 13:
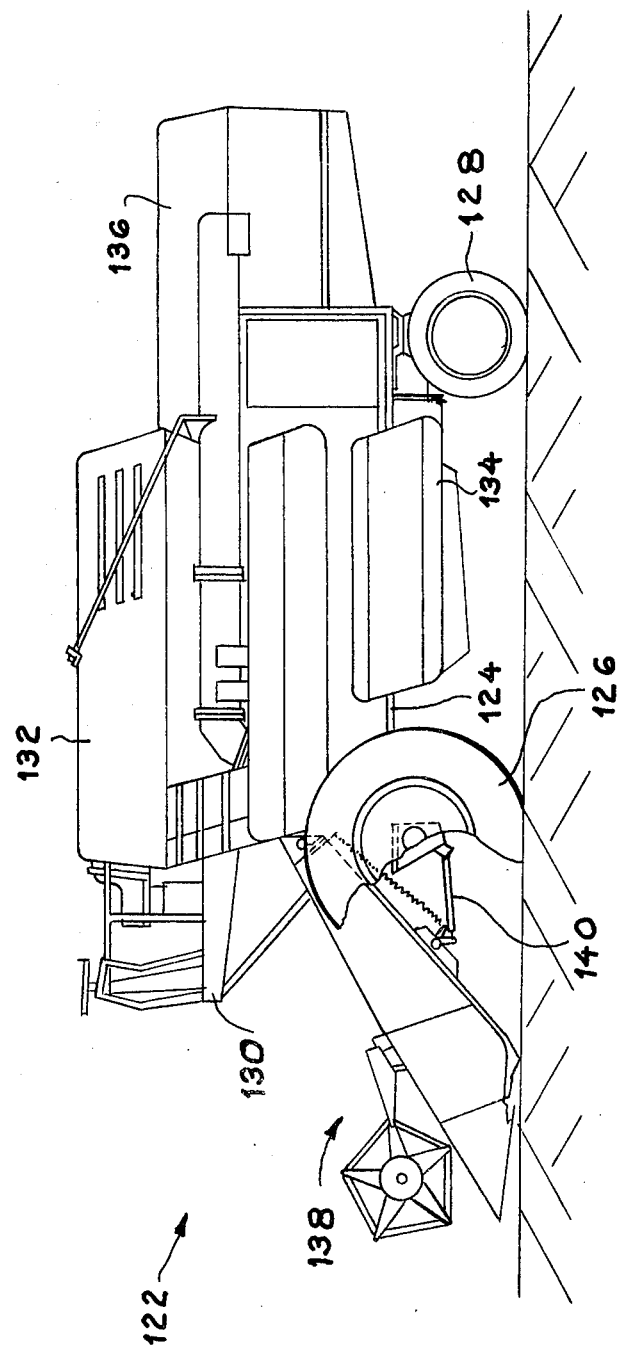

As in any conventional combine, the combine 122 illustrated in FIG. 13 comprises a main frame 124 supported on a pair of drive wheels 126 and a pair of steerable wheels 128 (only one wheel of each pair being shown). Supported on the main frame are an operator's platform 130, a grain tank 132, a grain cleaning mechanism 134 and an engine 136. A conventional header and feed conveyor 138 extends forwardly of the machine and the header is pivotally secured to the frame for general vertical movement which is controlled by extensible hydraulic cylinders 140. The main frame also supports a threshing and separating mechanism which is pertinent to the present invention and is generally indicated at 1.

As the combine is propelled forwardly over a field, the crop material to be harvested is severed from the stubble by a sickle bar cutter on the header and is conveyed by the feed conveyor 2 to the threshing and separating mechanism 1. The crop material received within the threshing and separating mechanism 1 is threshed, that is to say the crop material (which may be wheat, corn, rice, soy beans, rye, grass seed, barley, oats or other similar crop materials) is rubbed and beaten whereby the grain, seed etc., is loosed and separated from the straw, stalks, coils or other discardable part of the crop material.

The grain which has been separated from the straw falls onto the grain cleaning mechanism which includes means to separate chaff from the grain and means to separate unthreshed material (known in the art as tailings) from the grain. The cleaned grain is then elevated into the grain tank and the tailings are fed to unthreshed crop material delivered by the feed conveyor 2 to the threshing and separating mechanism.

The header as described is of the grain type but other forms of headers may be employed, as for example a corn header, depending on the crop to be harvested. The cut crop material is consolidated laterally of the machine by two opposed augers which feed the crop material centrally to the feed conveyor 2 in the form of a chain conveyor 3 mounted within a housing 4. The conveyor 3 in turn conveys the crop material to the threshing and separating mechanism 1.

The threshing portion 5 of the mechanism 1 comprises a rotatable thresher cylinder 6 co-operable with a stationary thresher concave 7. The thresher cylinder 6 is composed of a plurality of flanges 8 (FIG. 3) keyed on a transversely-extending shaft 9 rotatably mounted on the main frame. Around their peripheries the flanges 8 support a plurality of conventional rasp bars 10 which extend over a width generally corresponding with the width of the feed conveyor 2. The thresher concave 7 is composed of a number of fore-and-aft extending arcuate main bars 11 and a plurality of transversely-extending thresher bars 12. Furthermore, a plurality of arcuate wires 13 extend at regular intervals in fore-and-aft direction through apertures in the bars 12.

In between a discharge end 14 of the feed conveyor 2 and a forward end 15 of the thresher concave 7 a stone trap 16 is provided, extending substantially over the width of the threshing mechanism 5 and the feed conveyor 2. The gap between the stone trap 16 and the feed conveyor 2 is sealed by an arcuate ramp 17 and a co-operable sealing strip 18.

Rearwardly of the thresher cylinder 6 and the thresher concave 7 there is provided a deflector beater or so-called straw beater 19 with a co-operable grate 20. The straw beater 19 and grate 20 are of substantially the same width as the threshing mechanism 5 and are arranged behind the latter in a manner to receive the crop passing between the threshing cylinder 6 and the threshing concave 7 in a rearward direction of the machine. The straw beater 19 comprises a generally cylindrical body portion 21 which is secured on a transversely-extending shaft 22 which itself is rotatably supported on the main frame. A number of deflector plates 23 extending over the total width of the straw beater 19 and inclined rearwardly relative to the direction of rotation (indicated by arrow 85) are provided on the body portion 21. The deflector plates 23 may be replaced by deflector tines. The structure of the grate 20 is similar to that of the thresher concave 7 in that it comprises fore-and-aft extending arcuate main bars 24, transversely-extending bars 25 and fore-and-aft extending wires 26. The position of the grate 20 relative to the beater 19 may be made adjustable so that when the crops are extremely dry and brittle, the grate 20 may be lowered, whereby less pieces of short straw will be produced.

Rearwardly of the straw beater 19 a separating mechanism 27 is provided which comprises a single casing or housing 28 and two transversely-extending rotor structures 29 and 30. The width of the separating mechanism 27 substantially exceeds the width of the threshing mechanism 5 but the plane of symmetry of the former coincides with the plane of symmetry of the latter, whereby the outer ends 31 of the separating mechanism 27 extend past the respective ends 32 of the threshing mechanism 5.

Figure 6:
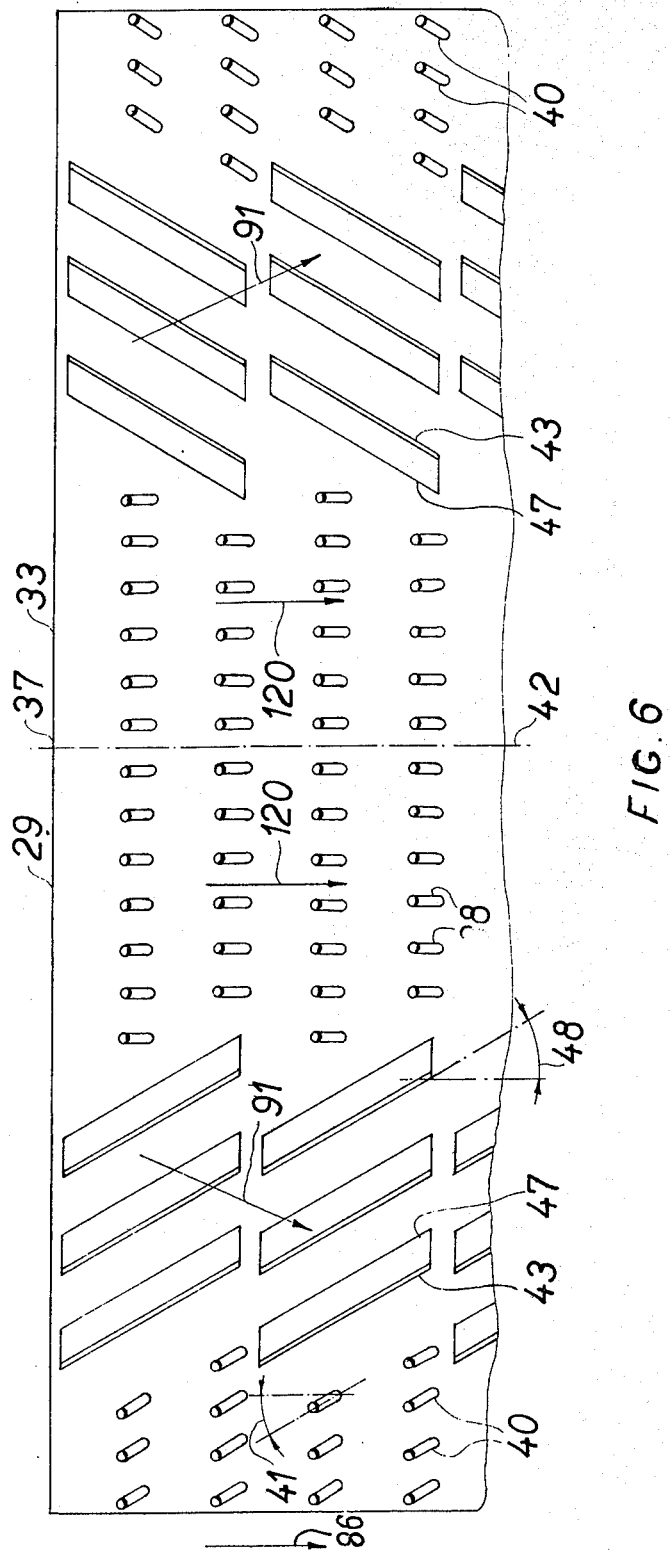

The rotors 29, 30 comprise respective generally cylindrical body portions 33, 34 which are secured to transversely-extending rotatable shafts 35, 36, although the body portions may be polygonal or of other shapes. Over a central area 37 of the body portion 33 of the forwardmost rotor 29 there are provided a plurality of rearwardly-inclined separator tines 38 as best seen in FIG. 6. The separator tines 38 are grouped in a number of transverse rows arranged at regular intervals around the body portion 33. The angle of inclination 39 (FIG. 3) of the tines 38 with respect to a radius of the rotor 29 is of the order of 30°.

The body portion 33 further supports similar separator tines 40 at its outer ends 31, but in addition to the rearward inclination 39 thereof, these tines 40 are also inclined in a transverse direction towards the outer ends defining thereby an angle 41 (FIG. 6) relative to the plane of symmetry 42 of the order of 30°. All the separator tines 38 and 40 have a general circular section but could have flat front operative beating surfaces.

Figure 4:
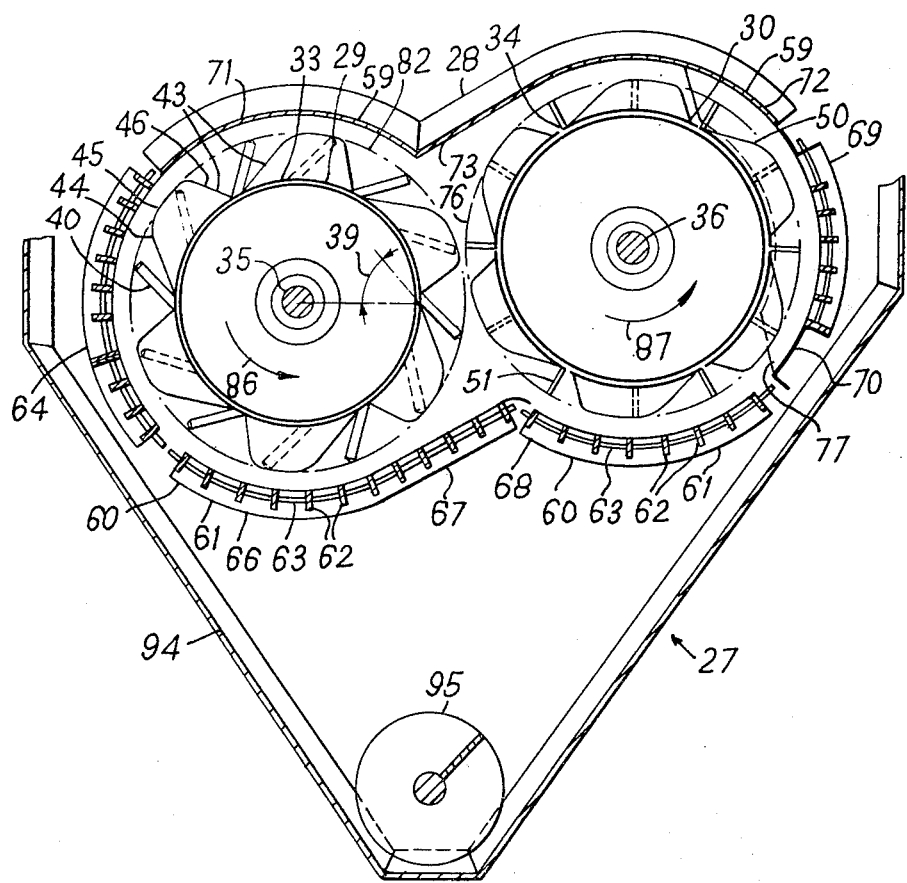
Figure 5:
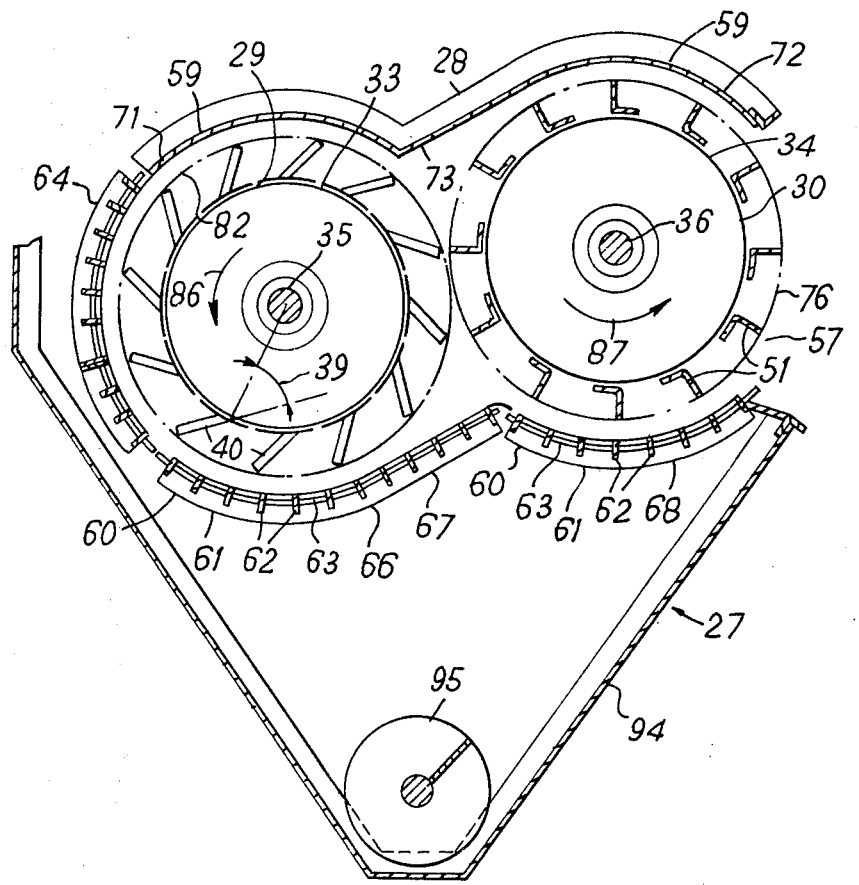

In between the neighbouring groups of tines 38 and 40, the body portion 33 also supports a plurality of separator vanes 43 having slightly rearwardly-inclined forward edges 44 (FIG. 4), arcuate outer edges 45, steeply inclined rearward edges 46 and lower mounting portions 47 (FIG. 6). The separator vanes 43 also extend at an angle 48 relative to the plane of symmetry 42 in the range of 20 to 60°. Adjacent separator vanes 43 are arranged in an overlapping relationship with respect to each other when seen in the direction of movement 91 of the crop material (FIG. 6).

The body portion 34 of the rotor 30 supports along most of its width a plurality of separator vanes 50 which are identical to the vanes 43 and arranged in a similar pattern. At its outer ends, the body portion 34 supports a number of discharge vanes 51 extending over an area 53 parallel to the axis of the rotor 30 and radially outwardly from the surface of the body portion. In-between each of the discharge areas 53 and a separator area 54 having the separator vanes 50, a free space 55 is left devoid of any crop treating elements. As seen from FIGS. 6 and 7, the transverse inclination of the separator vanes 43 and 50 as well as of the separator tines 40 on the left-hand side of the rotor bodies 33,34 is opposite to the transverse inclination of the corresponding vanes and tines on the right-hand side of those rotor bodies.

Figure 1:
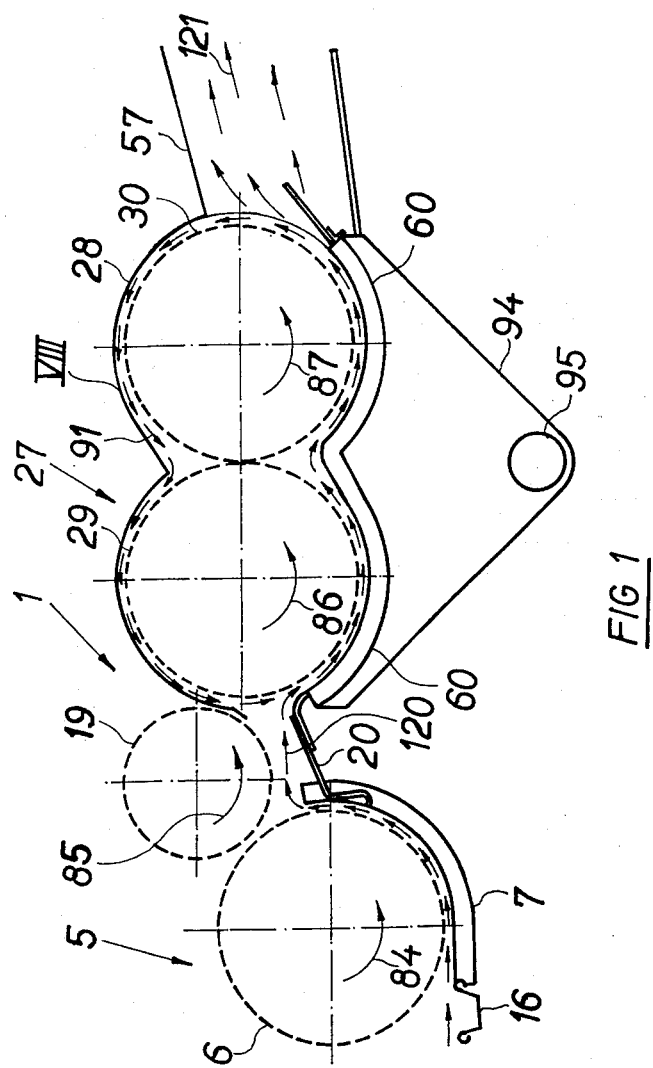
Figure 2:
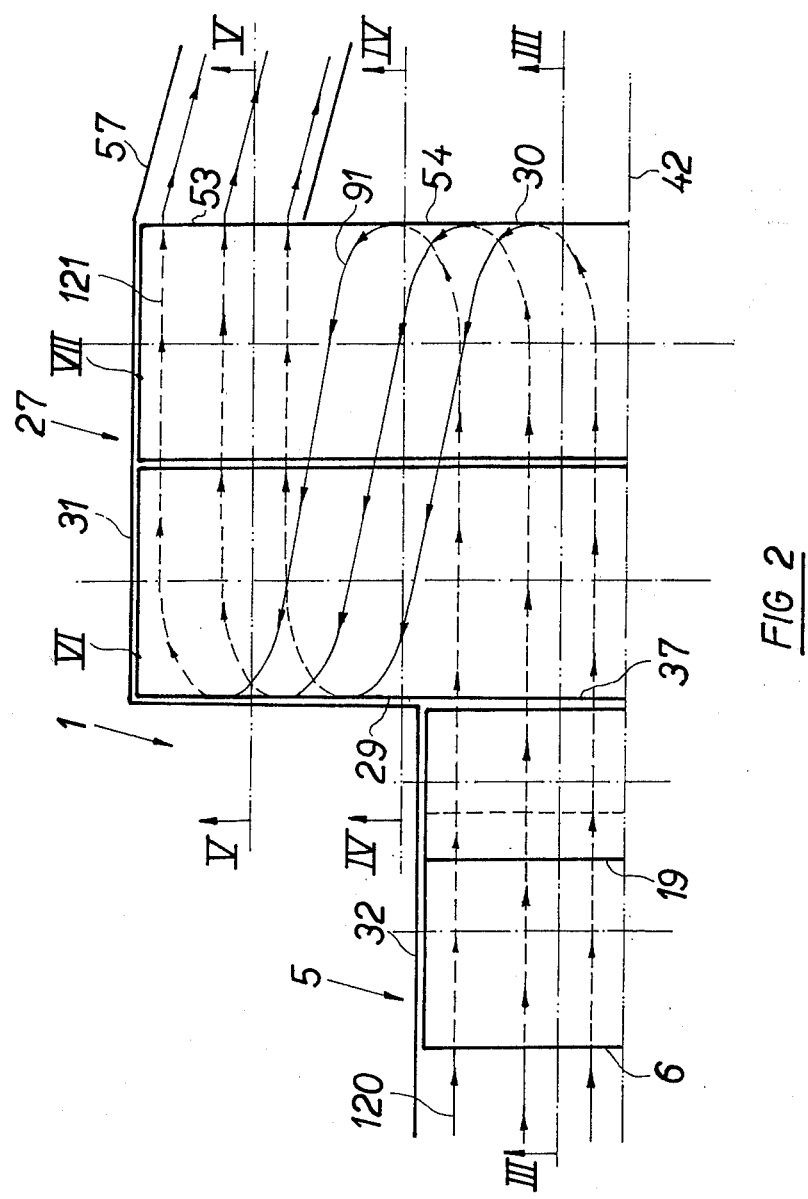
Figure 3:
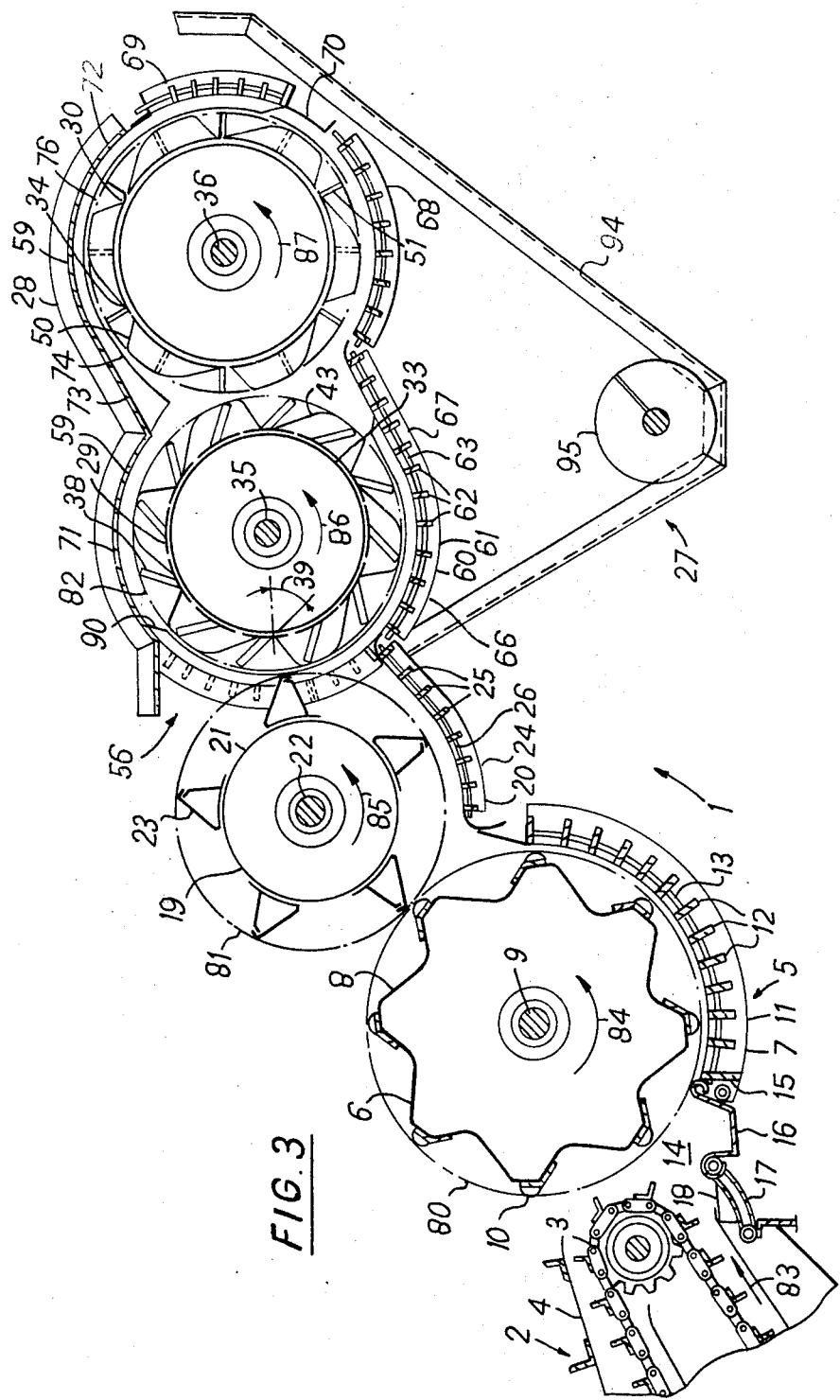

Turning now to the casing 28, it will be seen from FIG. 3 that it is provided with a central, rectangular, forwardly-facing infeed opening 56 which extends over generally the total width of the straw beater 19. At the location of the outer sections of a rear wall of the casing 28, two rearwardly-facing generally rectangular discharge openings 57 and 58 (FIG. 8) are provided having a width considerably smaller than the amount by which the casing 28 extends past the ends of the threshing mechanism 5. Furthermore, the casing 28 mainly comprises arcuate upper coverplates 59 and arcuate separator concaves 60 of the type similar to the thresher concave 7 and grate 20, thus having arcuate fore-and-aft extending main bars 61, transversely-extending separator bars 62 and arcuate fore-and-aft extending wires 63 provided through apertures in the separator bars 62. The separator concaves 60 are composed of a number of sections 64 to 69 (FIG. 8).

The concave sections 64 and 65 extend from respective sides of the infeed opening 56 and have a generally vertical orientation. The sections 66, 67 and 68 extend over the total width of the casing 28, one behind the other. The sections 66 and 68 are of generally arcuate shape while the section 67 is a relatively straight, rearwardly and upwardly extending transition concave between the sections 66 and 68. The concave section 68 is further extended in rearward direction by a smooth surface 70. The smooth surface 70 could, however, be replaced by an additional concave section. Finally, the rearmost concave section 69 and the smooth surface 70 are positioned between the discharge openings 57 and 58 and, consequently, are less wide than the preceding sections 66, 67 and 68. The rearmost concave section 69 has a generally vertical orientation. Some or all of the concave sections 64 to 69 may be adjustable with respect to the associated rotor.

Troughs 94 with two opposed augers 95 are arranged underneath the ends of the separator concaves 60 beyond the main frame for collecting the grain separated at these locations and moving it laterally of the machine to convey it towards the cleaning mechanism.

The coverplates 59 mainly comprise two arcuate sections 71 and 72 and a downwardly and forwardly extending generally straight transition section 73 connecting the sections 71 and 72 to each other. Spiral shaped fins 74 and 75 are arranged on the inner surface of the casing 28 and extend in opposed senses from the plane of symmetry 42. These fins 74, 75 are in close relationship with an outer generating line 76 of the separator blades 50 of the body portion 34 of the rotor 30.

Spiral shaped fins 77 and 78 are also provided on the inner surface of the casing 28 at the location of the inner edges of the discharge openings 57 and 58. These fins 77 and 78 extend forwardly and outwardly when seen in the direction of rotation of the neighbouring rotor 30 and are in close relationship to the cylindrical body portion 34 at the location of the free spaces 55 thereof. The coverplates 59 may be made readily removable for servicing purposes. Finally, annular fins 90 extend alongside the side edges of the infeed opening 56 and extend over the concave sections 66, 67.

As will be seen from FIG. 3, the outer generating lines 80,81,82 and 76 of the various threshing and separating components are in close relationship with respect to each other. The directions of rotation of the chain conveyor 3, the threshing cylinder 6, the straw beater 19 and the rotors 29 and 30 are indicated by respective arrows 83, 84, 86 and 87. Preferably both rotors 29 and 30 are driven at the same circumferential speed. Also this common rotational speed may be made adjustable by means of a belt variator, for example.

OPERATION

In operation, the chain conveyor 3 feeds the crop material in a generally flat mat extending over the total width of the feed conveyor 2, over the bottom plate of the housing 4 to the threshing and separating mechanism 1. The thresher cylinder 6 is rotated at a relatively high speed and the rasp bars 10 strike the crop material supplied thereto and entrail it in a rearward direction for passing between the thresher cylinder 6 and concave 7. While passing therebetween, the crop material is rubbed and beaten whereby the grains are loosed from the ears and the straw. A major percentage of the threshed grain is thus already separated from the straw in passing over the concave 7. If accidentally a stone or other comparatively large and solid piece of waste material is supplied to the threshing mechanism together with the straw, it is struck by a rasp bar 10 and projected into the stone trap 16, whereby the threshing and separating mechanism is safeguarded from damage.

The straw mat is passed from the thresher cylinder 6 and thresher concave 7 in a rearward and upward direction towards the straw beater 19 which is operative to deflect the straw mat in a rearwardly-extending direction between itself and the grate 20 and to pass it on to the middle section 37 of the rotor 29. The separator tines 38 of the rotor 29 are operative to convey the straw mat even further rearwardly between the rotor section 37 and the co-operable separator concave sections 66 and 67. The width of the straw mat remains generally unchanged while passing from the feed conveyor 2 to the middle section 37 of the rotor 29, via the threshing mechanism 5 and the straw beater 19. While passing all along this path 120 (FIG. 6) underneath the straw beater 19 and the middle section 37 of the rotor 29, the beater blades 23 operate on the straw and the separator tines 38 rake the same to ensure further separation of grain from the straw, the grain falling through the grate 20 and the separator concave sections 66 and 67.

Finally, the straw mat is supplied to the rotor 30 whereupon the separator vanes 50 rub the mat to accomplish further grain separation and to divide the mat into two generally equal portions which are further conveyed around the rotors 30 and 29 at the inner side of the casing 28 in two oppositely and outwardly directed general spiral paths 91. The fins 74 and 75 assist in securing a proper division of the straw mat into two equal portions and to convey them in the spiral paths 91. The straw is submitted to a further separating action by the separator vanes 43 and separator tines 40 of the rotor 29, and finally to the discharging action of the discharge vanes 51 of the rotor 30, whereby the straw mats are discharged from the separator means 27 in a direction 121.

The paths 120, 91 and 121 preferably only comprise one and a half loops or turns because, if more loops were involved, power consumption would very soon become too high. The transverse displacement of the straw mats is sufficiently great to ensure a fluent flow of the crop material around the rotors 29, 30 without any neighbouring loops obstructing each other. The fins 90 are also operative to assist in this. In this respect it should be noted that, after having completed the first loop, the transverse displacement of the crops is such that the mats are conveyed over the separator concave sections 64 and 65 along the side edges of the infeed opening 56. Consequently, the minimum width of the separator mechanism 27 is twice that of the infeed opening 56, although preferably the separator mechanism 27 is made even wider than that. While being conveyed through the separator mechanism 27, the straw mat normally should not be consolidated laterally of the machine as this would adversely influence the grain separation. The spiral shaped fins 77 and 78 are particularly advantageous in preventing grain losses as a result of grain being thrown towards the discharge openings 57 and 58 from the middle area of the separator means 27 over which crop is conveyed which still has to move over a complete loop and which thus still contains much grain. Also the closed structure of the body portions 33, 34 assists in preventing grain kernals from being thrown from the middle area of the separator means 27 to the discharge openings 57, 58.

As already mentioned, the separator tines 38 and 40, in conjunction with the associated separator concave sections, are operative to effect further grain separation. This is accomplished as the separator tines 38 and 40 rake the straw mat in order to fluff the mat and enable the grain entrailed therein to fall and separate from the mat through the associated separator concaves. The fact that the free ends of the separator tines 38, 40 trail with respect to the direction of rotation 85 prevents straw from becoming hooked around the tines which would otherwise cause jamming of the rotor 29. This orientation of the tines 38, 40 also enables the straw to move radially outwardly from the rotor 29 towards the inner walls of the casing 28, under the influence of centrifugal force, without any obstruction. The additional inclination 41 of the separator tines 40 assists in inducing the transverse displacement of the straw. However the outermost tines 40 may not have this additional inclination 41 in order substantially to prevent transverse displacement of the crop material at the ends of the rotor 29.

The slightly upwardly inclined front edges 44 of the separator vanes 43 and 50 urge the crop material radially outwardly against the inner walls of the casing 28, while the upper edges 45 thereof rub on the crop material and hold it in contact with said inner walls, whereby further grain separation is effected. The orientation of the vanes 43, 50 and this rubbing action also result in a positive spiral movement 91 as already explained. It should be noted that the overlapping of the separator vanes 43, 50 in the direction of spiral movement 91 of the crop prevents the straw from becoming disposed in between neighbouring vanes and consequently causing jamming of the rotor.

Grain separation is further improved by the successive, rather abrupt, changes in the movement of the crop material at the transition areas between the rotors 29, 30 as at these locations the straw mats are struck so as to be deflected to another direction of movement. Also changes in the speed of the moving crop material further improves grain separation.

Finally, the smooth plate 70, which is positioned at the location where the straw mats have to move in an upward direction, is intended to reduce at that location the resistance to the movement of the crop and consequently to accelerate this movement, in order even further to improve grain separation.

ADVANTAGES OF THE PREFERRED EMBODIMENT

In the above described embodiment of the invention the threshing and separating mechanisms, and consequently the threshing and separating operations, are made independent from each other, whereby it is relatively easy to provide individual adjusting means for each of the mechanisms (e.g. speed variator means for the movable components and position adjusting means for the stationary components) so that one has a better control on the various characteristics of the threshing and separating functions, and hence it becomes possible to obtain an optimum combination in threshing and separation performance. As is known from conventional machines, the conventional type of threshing mechanism has a very adequate threshing operation and a large capacity at a reduced horesepower level. The separating mechanism of the embodiment of FIGS. 1 to 8 has an equally large capacity at an acceptable horsepower consumption and grain loss level.

In the present machine the crop is passed much faster therethrough than through conventional machines, whereby at any time the thickness of the straw mat is smaller resulting in a higher efficiency with comparatively lower grain loss levels at a given capacity. Also, it has been experienced that the present machine is less sensitive to a high degree of humidity of the crop, which in conventional machines very often causes considerable grain losses. Moreover, as the pattern of movement of the crop around the rotors 29, 30 only comprises a reduced number of loops, the risk of cessation of movement of the crop, and resultant jamming, occurring is reduced considerably, i.e. with the present invention a smooth, regular and continuous flow of crop through the machine is ensured. Also the movement of the crop from one component to another is very positive and hence trouble-free.

Another advantage is that no additional components are required when installing a stone trap in front of the threshing mechanism. In axial-flow-type combines, the provision of a stone trap also necessitates the provision of a beater or the like to impell the stones into the trap.

Normally the cleaning mechanism extends below the threshing and separating mechanism and is of a width corresponding to the width of the threshing mechanism. The grain precipitation through the threshing and separating concaves at the location above the cleaning mechanism is very even (seen in transverse direction of the machine) while the grain separated at the separator concaves extending past the side edges of the cleaning shoe can very easily be supplied in an even pattern to the grain pan of the cleaning mechanism. Also the percentage of grain separated at these outer locations is rather minor. This results in an even load of the cleaning mechanism, enabling an optimum operation thereof at high capacities. Also the threshing and separating mechanism according to the invention produces less short pieces of straw, when compared, for example, with axial-flow-type combines whereby improper operation of the cleaning mechanism (due to overload) is reduced. Furthermore, the threshing and separating mechanisms have little or no disturbing influence on the cleaning operation of the cleaning mechanism in that they do not produce troublesome currents during air or rotation.

Further, as the volume of the threshing and separating mechanism of a havesting machine embodying the present invention is considerably smaller than a conventional threshing and separating mechanism of comparable capacity, it is possible to provide a compact machine with a low profile, which in turn is very advantageous in many respects as is known to those skilled in the art. Also the present invention enables the provision of simple and cheap drive means for all components of the threshing and separating mechanism.

Finally, in conventional machines, the combine operator experiences much hindrance from dust originating in the header and rising therefrom towards the operator's platform. with the present invention, when in use, a substantial suction is created at the infeed opening of the feed elevator 2 by the various spinning cylinders and rotors inside the machine. Thus, much of the dust is conveyed through the machine and hence the dust problem of conventional machines is substantially reduced if not eliminated.

MODIFICATIONS

Modifications and alterations to the described preferred embodiment of the invention may be made without departure from the spirit and scope of the invention. For example, as shown in FIGS. 9 and 10, the rotor 30 may be positioned above the rotor 29 rather than behind. Thereby it is possible even further to increase the total surface of separator concaves as in this arrangment it is possible to provide such concaves all around the rotors 29 and 30. Discharge conveyors for discharging the straw are generally indicated at 96.

In another modified structure, the straw beater 19 and co-operable concave 20 may be removed, whereby the rotor 29 and co-operable concaves are positioned immediately behind the threshing mechanism 5. In a still further modified structure, the central area 37 of the rotor 29 and the associated separator concave sections may be replaced by the threshing mechanism 5 comprising a threshing cylinder 6 and a threshing concave 7. In this arrangement the threshing mechanism extends coaxially with the rotor 29.

Both of the foregoing modifications make it possible further to decrease the dimensions of the machine.

Figure 11:
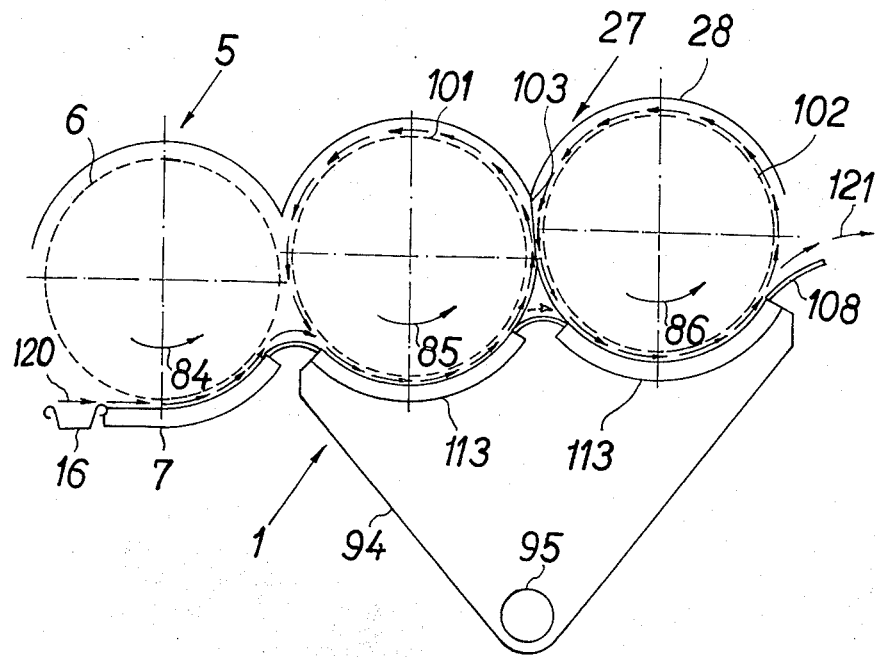
Figure 12:
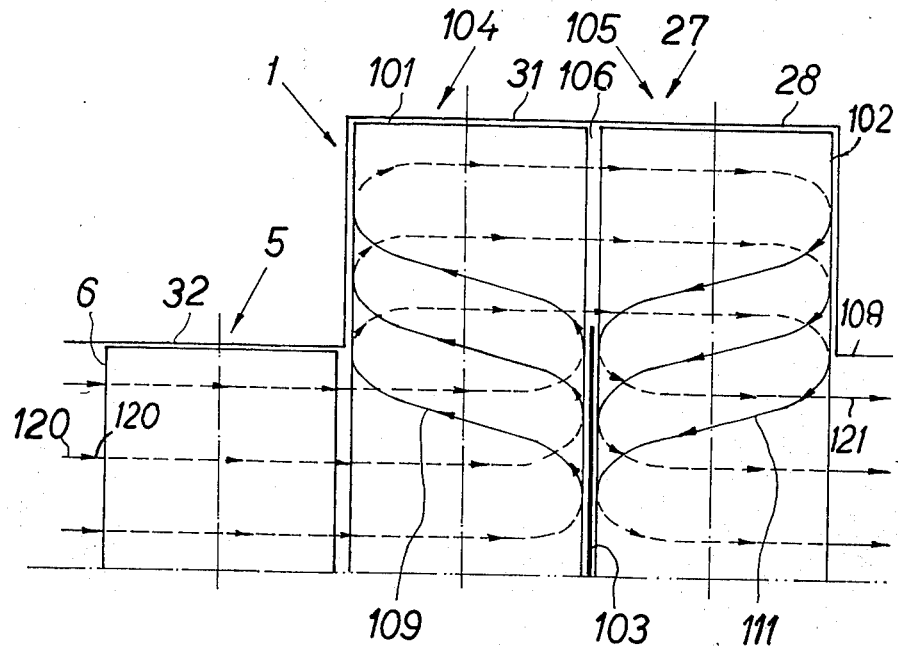

FIGS. 11 and 12 show another modified embodiment wherein the separator means 27 comprise a first rotor 101 and a second rotor 102 which are separated from each other by an intermediate wall 103 defining two independent sections 104 and 105 in the separator casing 28. Transit openings 106 at the outer ends of the casing 28 interconnect the sections 104 and 105. A single discharge opening 108 is provided in the rear wall of the casing 28 at a central area thereof. In this arrangement the separating elements provided on the rotors 101 and 102 are arranged in such a manner as to convey the crop first in two opposite and outwardly-directed paths 109 around the first rotor 101, then to transfer the crop to the second rotor 102 through the openings 106 and then to convey the crop in opposite but inwardly-directed spiral paths 110 around the second rotor 102 towards the central discharge opening 108 through which the straw is discharged. The separator concaves 113 co-operating with the rotors 101 and 102 are principally identical to those described above with reference to FIGS. 1 to 8.

In this embodiment, as well as in all other preceding embodiments, cutter means may be arranged on the first rotor 101 or 29 and on the co-operable concave 60, 113 for co-operating with each other and to effect the required division of the single mat of straw material received from the threshing mechanism 5 into two substantially equal portions. For example, a stationary tine may be arranged exactly in the plane of symmetry 42 on the concave section 66 so as to be cooperable with those of the movable tines 38 which are positioned closest to the plane of symmetry in a manner to separate the mat of crop material into two equal portions. Vanes of the type similar to the vanes 50 may also be provided on the rotor 29 or 101 at the location of the plane of symmetry 42 to assist in the separation of the mat of crop material.

Other modifications and alterations are still possible without departure from the present invention such as, for example, the provision of separator tines and vanes with flat or rounded off front operative surfaces, the provision of only one separating rotor, or the provision of more than two rotors. Also the tines 38 and 40 of the neighbouring rows may be staggered with respect to each other. Furthermore, the tines 38 may be replaced by beater plates of the type as provided on the straw beater 19, while the vanes 43 and 50 may be replaced by spiral shaped separator plates or bars extending over the total width of the section of the rotors which according to FIGS. 6 and 7 have been provided with such vanes. These spiral shaped plates or bars are operable further to separate grain from the straw as well as to induce transverse displacement of the crop material.

The separator vanes 50, or similar vanes with a different inclination relative to the rotor axis, may extend almost as far as the inner ends of the discharge blades 51. However, in this latter arrangement the spiral fins 77–78 should then extend annularly in the housing 28.

Also, the tines, vanes, fins etc. may have shapes which differ from those already described herein.

The fins 90 may be provided on the outer circumference of the rotor 29 or 101 instead of on the inner side of the housing 28. Also, when provided on the inner side of the housing 28, the fins 90 may extend spirally, similarly to the fins 74, 75, for example.

As far as the various concaves are concerned, it is clear that the construction thereof may differ from the constructions herebefore described. Indeed, the concave wires 63 may be provided at the upper side of the separator bars 62 or the concave sections 64–69 may be formed by perforated plates. Also the connecting section 73 between the sections 71 and 72 of the cover plates may be spaced a greater distance from the rotors, thereby providing a much larger free space above the rotors. In this arrangement the crop material is thrown in a forward direction towards the rotor 29 through said free space and along the under side of the connecting section 73 which may be provided with crop material deflecting fins.

Finally, the straw beater 19 may be provided with special beater elements or the like which are operative laterally to consolidate the straw mat passing between the beater and the cooperable concave for feeding it through the infeed opening 56 of the separator mechanism 27 which has a smaller width than the threshing mechanism 5.

We claim:
1. An agricultural harvesting machine comprising:
   a. a frame adapted to travel across a field,
   b. means for conveying crop material from the field to the frame,
   c. means transversely mounted to said frame rearwardly of the conveying means for threshing grain from the crop material,
   d. a rotary separating mechanism mounted to said frame rearwardly of the threshing means and disposed substantially parallel thereto with its ends extending over substantially equal distances past the respective ends of said threshing means, the separating mechanism being adapted to receive crop material from the threshing means over a width substantially corresponding to the width of the threshing means and to spirally convey said crop material in layers of substantially half the width of said threshing means towards each of its ends while submitting said layers of material to a separating action, and
   e. said separating mechanism comprising a transversely-extending separator casing having a substantially forwardly facing infeed opening, the infeed opening having a width substantially corresponding to the width of said threshing means and adapted to receive crop material from said threshing means.

2. An agricultural harvesting machine, as described in claim 1, wherein said separator casing comprises rearwardly facing discharge openings positioned at opposite ends of said casing.

3. An agricultural harvesting machine, as described in claim 2, wherein said separator casing comprises substantially vertically extending concaves positioned between the discharge openings to enable grain to be separated from said crop material.

4. An agricultural harvesting machine comprising:
a. a frame adapted to travel across a field,
b. means for conveying crop material from the field to the frame,
c. means transversely mounted to said frame rearwardly of the conveying means for threshing grain from the crop material,
d. a separator casing mounted to said frame rearwardly of the threshing means and disposed substantially parallel thereto for receiving said crop material from the threshing means over a width substantially corresponding to the width of the threshing means, the casing having ends extending over substantially equal distances laterally beyond the respective ends of said threshing means and comprising concaves mounted to said frame to enable separated grain to pass therethrough, said casing further including a forwardly facing opening having a width substantially corresponding to the width of the threshing means and adapted to receive crop material from said threshing means, said casing also including rearwardly facing discharge openings positioned at either end of said casing and transversely offset relative to the infeed opening for discharging crop material from said casing, and
e. means rotatably mounted within said casing and operably associated therewith to spirally convey crop material laterally in layers of substantially half the width of the threshing means towards each of its ends while submitting said layers of material to a separating action.

5. An agricultural harvesting machine, as described in claim 4 wherein the rotatably mounted means comprise a transversely extending separating rotor rotatably mounted with said casing having means associated therewith for treating and conveying said crop material.

6. An agricultural harvesting machine, as described in claim 4, wherein the rotatably mounted means comprise two transversely extending rotors having crop treating and crop conveying elements, the rotors being arranged in parallel relationship and driven in the same direction.

7. An agricultural harvesting machine, as described in claim 4 wherein the rotatably mounted means comprise a plural number of transversely-extending separating rotors, the rotors being arranged circumferentially to convey the crop material in a pattern circumscribing the rotors, first in a rearward direction underneath the central area of the first rotor and then spirally around the rotors in outward directions.

8. An agricultural harvesting machine, as described in claim 4, wherein means for receiving and consolidating the grain separated from said crop material is mounted to said frame below said separator casing.

9. An agricultural harvesting machine, as described in claim 8, wherein the consolidating means comprises a trough mounted to said frame below said casing and a conveyor mounted within the trough for conveying grain within said trough to a cleaning mechanism.

10. An agricultural harvesting comprising:
a. a frame adapted to travel across a field;
b. means for conveying crop material from the field to the frame;
c. means transversely mounted to said frame rearwardly of the conveying means for threshing grain from the crop material;
d. at least one separator casing mounted to said frame rearwardly of the threshing means and disposed substantially parallel thereto for receiving said crop material over a width substantially corresponding to the width of the threshing means, the casing having ends extending over substantially equal distances laterally beyond the respective ends of said threshing means and comprising concaves mounted to the bottom of said frame to enable separated grain to pass therethrough, said concaves having at least two fore-and-aft extending arcuate concave sections and a substantially straight concave section positioned between the two arcuate concave sections; and
e. means rotatably mounted within the casing and operably associated therewith to spirally convey said crop material laterally in layers of substantially half the width of the threshing means towards each of its ends while submitting said material to a separating action.

11. An agricultural harvesting machine comprising:
a. a frame adapted to travel across a field;
b. means for conveying crop material from the field to the frame;
c. means transversely mounted to said frame rearwardly of the conveying means for threshing grain from the crop material;
d. at least one separator casing mounted to said frame rearwardly of the threshing means and disposed substantially parallel thereto for receiving said crop material from the threshing means over a width substantially corresponding to the width of the threshing means, the casing having ends extending over substantially equal distances laterally beyond the respective ends of said threshing means and comprising concaves mounted to said frame to enable separated grain to pass therethrough, said separator casing further comprising interior spiral fins operable to induce transverse displacement of said crop material; and
e. means rotatably mounted within said casing and operably associated therewith to spirally convey said crop material laterally in layers of substantially half the width of the threshing means toward each of its ends while submitting said material to a separating action.

12. An agricultural harvesting machine comprising:
a. a frame adapted to travel across a field,
b. means for conveying crop material from the field to the frame,
c. means transversely mounted to said frame rearwardly of the conveying means for threshing grain from the crop material, and
d. a rotary separating mechanism mounted to said frame rearwardly of the threshing means, the separating mechanism comprising a casing with first and second rotors mounted therein, an intermediate wall in the casing defining two independent sections and separating the first and second rotors from each other, transit openings at the outer ends of the casing interconnecting said sections and a central discharge opening at the rear of said casing, the first rotor comprising crop treating and crop conveying elements which operate to separate grain from said crop material as well as to convey said crop material in two opposite and outwardly directed paths spirally around said first rotor and then transfer said crop material to the second rotor through the transit openings, and the second rotor comprising crop treating and crop conveying elements which separate grain from the crop material as well as convey said crop material in opposite but inwardly directed spiral paths around said second rotor towards the discharge opening to discharge said material therethrough.

* * * * *